(12) United States Patent
Mendes Rodrigues

(10) Patent No.: US 10,775,349 B2
(45) Date of Patent: Sep. 15, 2020

(54) DEFECT DETECTION USING ULTRASOUND SCAN DATA

(71) Applicant: FUJITSU LIMITED, Kawasaki-shi, Kanagawa (JP)

(72) Inventor: Eduarda Mendes Rodrigues, Northwood (GB)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 15/908,256

(22) Filed: Feb. 28, 2018

(65) Prior Publication Data

US 2018/0299412 A1     Oct. 18, 2018

(30) Foreign Application Priority Data

Apr. 12, 2017    (EP) .................................. 17166228

(51) Int. Cl.
   *G01N 29/04*      (2006.01)
   *G10H 1/16*       (2006.01)
   (Continued)

(52) U.S. Cl.
   CPC ....... *G01N 29/043* (2013.01); *G01N 29/0645* (2013.01); *G01N 29/11* (2013.01);
   (Continued)

(58) Field of Classification Search
   CPC .. G01N 29/043; G01N 29/4427; G01N 29/11; G01N 29/48; G01N 29/4454;
   (Continued)

(56) References Cited

U.S. PATENT DOCUMENTS

2013/0104659 A1    5/2013  Parker et al.
2016/0202213 A1    7/2016  Volker et al.

FOREIGN PATENT DOCUMENTS

DE    10 2009 050 160 A1    5/2011
EP         2 811 294 A1     12/2014
            (Continued)

OTHER PUBLICATIONS

Translation of EP-2811294-A1 (not provided as the document is in english) (Year: 2014).*

(Continued)

*Primary Examiner* — Nathaniel T Woodward
(74) *Attorney, Agent, or Firm* — Staas & Halsey LLP

(57) ABSTRACT

An automatic defect detection method for detecting a defect in an object comprises: obtaining ultrasound scan data of the object, dividing echo amplitude values of the data into a plurality of sub-sets; assessing each sub-set to determine whether any echo amplitude values resulted from a structure of interest; computing for each sub-set, using at least a representative position of the structure portion of the sub-set and of a neighboring sub-set, a preselected mathematical function which is directly or inversely proportional to a distance between the representative positions; identifying sub-sets having a computed value that does not meet a predetermined criterion as regions of the ultrasound scan data that require inspection; issuing a notification indicating whether or not a region requiring inspection has been found; and if a region requiring inspection been found, storing data identifying the region in a database.

15 Claims, 12 Drawing Sheets

(51) Int. Cl.
  *G01N 29/44* (2006.01)
  *G01N 29/48* (2006.01)
  *G01N 29/11* (2006.01)
  *G01N 29/06* (2006.01)

(52) U.S. Cl.
  CPC ....... *G01N 29/449* (2013.01); *G01N 29/4418* (2013.01); *G01N 29/4427* (2013.01); *G01N 29/4454* (2013.01); *G01N 29/4472* (2013.01); *G01N 29/48* (2013.01); *G10H 1/16* (2013.01); *G01N 2291/015* (2013.01); *G01N 2291/0231* (2013.01); *G01N 2291/0258* (2013.01); *G01N 2291/0289* (2013.01); *G01N 2291/044* (2013.01); *G01N 2291/106* (2013.01); *G01N 2291/2626* (2013.01)

(58) Field of Classification Search
  CPC ............. G01N 29/449; G01N 29/4472; G01N 29/4418; G01N 29/0645; G01N 2291/106; G01N 2291/2626; G01N 2291/0258; G01N 2291/0231; G01N 2291/044; G01N 2291/015; G01N 2291/0289; G10H 1/16
  USPC ........................................................ 73/1.82
  See application file for complete search history.

(56) References Cited

FOREIGN PATENT DOCUMENTS

| | | | |
|---|---|---|---|
| EP | 2811294 A1 * | 12/2014 | ............. G01N 29/07 |
| JP | 2005-156305 | 6/2005 | |
| JP | 2014-54362 | 3/2014 | |

OTHER PUBLICATIONS

Extended European Search Report dated Aug. 14, 2017 in corresponding European Patent Application No. 17166228.1.

* cited by examiner

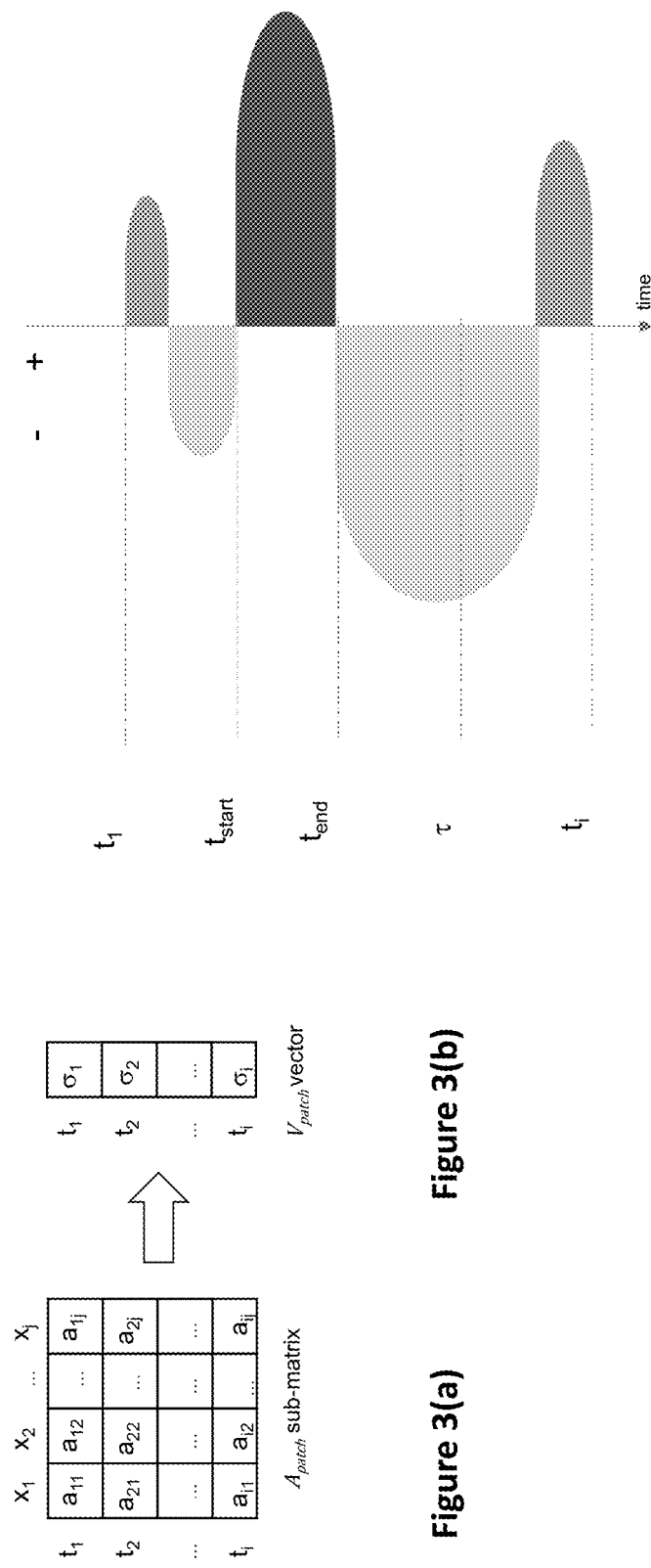

DEFECT DETECTION USING ULTRASOUND SCAN DATA

CROSS-REFERENCE TO RELATED APPLICATIONS

This application claims the benefit of European Patent Application No. 17166228.1, filed Apr. 12, 2017, in the European Intellectual Property Office, the disclosure of which is incorporated herein by reference.

BACKGROUND

1. Field

The present embodiments relate to defect detection using ultrasound scan data.

2. Description of the Related Art

Ultrasonic non-destructive testing (NDT) is a non-invasive technique that is used for determining the integrity of materials, such as fiberglass used in manufacturing, or structures, and enables the detection of internal defects in the test object. In this technique, one or more ultrasound probes emit sound waves that propagate inside the object and receive the echoes resulting from interactions with the internal structures. The distance of the reflector material can be accurately estimated based on the speed of the sound wave.

SUMMARY

Additional aspects and/or advantages will be set forth in part in the description which follows and, in part, will be apparent from the description, or may be learned by practice of the embodiments.

Signals caused by reflections due to flaws, such as discontinuities, wrinkles, trapped objects, air pockets, etc., can be identified in the scans. This technique is widely used in industry as part of manufacturing quality control processes. Currently the detection is a manual process, involving a thorough visual inspection of each section of the scan. Depending on the dimensions of the test object, a trained operator can spend several hours looking through visualizations of the scans in order to identify regions of the structure that may have defects and require physical inspection. The operator uses visual cues, such as structure curvatures or discontinuities, to flag potential defects. This is done through interactive visualization of the raw scan data, which enables adjustment of saturation thresholds, zooming, etc. Although the operators are highly-trained, the inspection is not guaranteed to have full coverage of all defects due to noise in the raw data, resulting from the propagation of echoes, and/or issues with the visualization.

Previously-proposed methods aim to facilitate automatic recognition of defects in an initial stage of the quality control process, thereby allowing quality control engineers/technicians to complete their inspections in more efficient ways, taking less inspection time per test object and hence reducing the overall human effort and costs. In particular, automatic identification of the location of such structures as the test object back wall enables improved defect analysis.

Some previously-proposed methods of wall detection employ image analysis based approaches. As such, they are sensitive to the visual properties of the plotted scan, such as an RGB color scheme that is applied to convert amplitude values to image pixel colors. Image segmentation techniques employed in some methods rely on heuristics that depend on color properties. Furthermore, such techniques work on a global scan level, rather than on localized regions of the scan.

It is desirable to provide an improved automatic defect detection method.

According to an embodiment of a first aspect there is provided an automatic defect detection method for detecting a defect in an object, wherein the method comprises: obtaining ultrasound scan data derived from an ultrasound scan of the object under consideration, the ultrasound scan data being in the form of a set of echo amplitude values representing the amplitude of echoes received from the object during ultrasound scanning at certain spatial and temporal points; dividing the set of echo amplitude values into a plurality of sub-sets; assessing each sub-set to determine whether any echo amplitude values of that sub-set may have resulted from a portion of a structure of interest of the object; computing for each sub-set, using at least a representative position of the structure portion of the sub-set and of another one of the sub-sets which neighbors that sub-set, a value of a first preselected mathematical function which is directly or inversely proportional to a distance between the representative positions; identifying sub-sets having a value of the first preselected mathematical function that does not meet a predetermined criterion as regions of the ultrasound scan data that require inspection; issuing a notification indicating whether or not a region requiring inspection has been found; and, if a region requiring inspection has been found, storing data identifying the region in a database.

Embodiments provide an automated mechanism for identifying missing wall structure or discontinuities in the ultrasound scans, through raw scan data processing rather than scan image analysis methods. Embodiments do not depend on any visual features, such as color mapping applied to visualize the scans, and consequently avoid the introduction of additional heuristics into the detection process.

Embodiments may employ raw data analysis to identify the relevant wall structures in the test object scan, using a localized data processing approach. In particular, embodiments may provide an automatic method of detecting relevant structures in non-destructive testing (NDT) ultrasound scan data in which local areas of the scan where the relevant structure is missing may be identified. In an embodiment an amplitude transform may be applied to local scan data regions to identify the most salient structure in each local scan data region and then combines this information to identify bounding regions for the whole structure. In embodiments it is assumed that the salient structure of the object under test, for example the back wall of the object, is a continuous structure. This allows a model based on the distance between portions of the structure in local scan data regions, for example (but not exclusively) a magnetic poles force model, to be used to determine missing and outlier bounding regions of the wall structure.

In an embodiment an artificial structure portion, having a preset representative position, is assigned to each sub-set where it has been determined that no echo amplitude values resulted from a portion of a structure of interest.

The representative position of the structure portion may be computed for each sub-set where it has been determined that echo amplitude values may have resulted from a portion of a structure of interest, for example by computing a centroid of a bounding box containing the structure portion.

An embodiment of the method further comprises computing the first preselected mathematical function for each sub-set using, in addition to the representative positions, a representative magnitude of the structure portion of the sub-set and the another one of the sub-sets which neighbors that sub-set, where the first preselected mathematical function is inversely proportional to the distance between the representative positions and is directly proportional to each of the representative magnitudes.

In this case an artificial structure portion, having a preset representative position and a preset representative magnitude, is assigned to each sub-set where it has been determined that no echo amplitude values resulted from a portion of a structure of interest.

The representative position and the representative magnitude of the structure portion are computed for each sub-set where it has been determined that echo amplitude values may have resulted from a portion of a structure of interest. The representative position of the structure portion may be computed by computing a centroid of a bounding box containing the structure portion, and the representative magnitude of the structure portion may be computed by applying a second preselected mathematical function to a parameter derived from the amplitude values forming a largest sequence of positive representative amplitude values.

In an embodiment of the method, assessing each sub-set to determine whether any echo amplitude values of that sub-set may have resulted from a portion of a structure of interest of the object comprises: for each sub-set, deriving from the amplitude values in the sub-set a vector comprising a representative amplitude value for each time point in the sub-set; determining for each vector whether the vector includes a sequence of positive representative amplitude values; and, if so, for each vector, identifying the largest sequence of positive representative amplitude values in the vector as a portion of a structure of interest and using the start time point and end time point of the largest sequence to compute a bounding box containing the structure portion. Deriving a vector may comprise applying a third preselected mathematical function, comprising an aggregation function, to those amplitude values in the sub-set which correspond to echoes received at the same time. The third preselected mathematical function may further comprise a smoothing function.

According to an embodiment of a second aspect there is provided a computer program which, when run on a computer, causes that computer to carry out a method embodying the first aspect.

According to an embodiment of a third aspect there is provided a defect detection apparatus for detecting a defect in an object, the apparatus comprising: a first processor to process ultrasound scan data derived from an ultrasound scan of the object under consideration, the ultrasound scan data being in the form of a set of echo amplitude values representing the amplitude of echoes received from the object during ultrasound scanning at certain spatial and temporal points, the processor operating to implement at least: a data divider to divide the set of echo amplitude values into a plurality of sub-sets; and a structure assessor to assess each sub-set to determine whether any echo amplitude values of that sub-set may have resulted from a portion of a structure of interest of the object; and a second processor operating to implement at least: a calculator to compute for each sub-set, using at least a representative position of the structure portion of the sub-set and of another one of the sub-sets which neighbors that sub-set, a value of a first preselected mathematical function which is directly or inversely proportional to a distance between the representative positions; a defect detector to identify sub-sets having a value of the first preselected mathematical function that does not meet a predetermined criterion as regions of the ultrasound scan data that require inspection, issue a notification indicating whether or not a region requiring inspection has been found, and, if a region requiring inspection has been found, store data identifying the region in a database.

In an embodiment the structure assessor may be configured to assign an artificial structure portion, having a preset representative position, is assigned to each sub-set where it has been determined that no echo amplitude values resulted from a portion of a structure of interest.

The calculator may be configured to calculate the representative position of the structure portion for each sub-set where it has been determined that echo amplitude values may have resulted from a portion of a structure of interest, for example by computing a centroid of a bounding box containing the structure portion.

The calculator may be configured to compute the first preselected mathematical function for each sub-set using, in addition to the representative positions, a representative magnitude of the structure portion of the sub-set and the another one of the sub-sets which neighbors that sub-set, where the first preselected mathematical function is inversely proportional to the distance between the representative positions and is directly proportional to each of the representative magnitudes.

In this case the structure assessor may be configured to assign an artificial structure portion, having a preset representative position and a preset representative magnitude, to each sub-set where it has been determined that no echo amplitude values resulted from a portion of a structure of interest.

The calculator may be configured to compute the representative position and the representative magnitude of the structure portion for each sub-set where it has been determined that echo amplitude values may have resulted from a portion of a structure of interest. The calculator may be configured to compute the representative position of the structure portion by computing a centroid of a bounding box containing the structure portion, and to compute the representative magnitude of the structure portion by applying a second preselected mathematical function to a parameter derived from the amplitude values forming a largest sequence of positive representative amplitude values.

In an embodiment of the apparatus, the structure assessor may be configured to assess each sub-set to determine whether any echo amplitude values of that sub-set may have resulted from a portion of a structure of interest of the object by: for each sub-set, deriving from the amplitude values in the sub-set a vector comprising a representative amplitude value for each time point in the sub-set; determining for each vector whether the vector includes a sequence of positive representative amplitude values; and, if so, for each vector, identifying the largest sequence of positive representative amplitude values in the vector as a portion of a structure of interest and using the start time point and end time point of the largest sequence to compute a bounding box containing the structure portion. The structure assessor may be configured to derive a vector by applying a third preselected mathematical function, comprising an aggregation function, to those amplitude values in the sub-set which correspond to echoes received at the same time. The third preselected mathematical function may further comprise a smoothing function.

In a method or apparatus of an embodiment, the object under consideration may be at least one of: a manufactured object; and an object used in manufacture.

In a method or apparatus of an embodiment, a defect detected in the object may be used to determine at least one of: the structural integrity of material forming at least part of the object; and flaws in material forming at least part of the object.

BRIEF DESCRIPTION OF THE DRAWINGS

These and/or other aspects and advantages will become apparent and more readily appreciated from the following description of the embodiments, taken in conjunction with the accompanying drawings of which:

Reference will now be made, by way of example, to the accompanying drawings, in which:

FIG. 3(a) illustrates a sub-matrix $A_{patch}$ derived in the wall structure detection process;

FIG. 3(b) illustrates a vector $V_{patch}$ derived from the sub-matrix $A_{patch}$;

FIG. 4 is a plot of the values of the vector $V_{patch}$ after application of an amplitude transform;

DETAILED DESCRIPTION

Figure 1A:
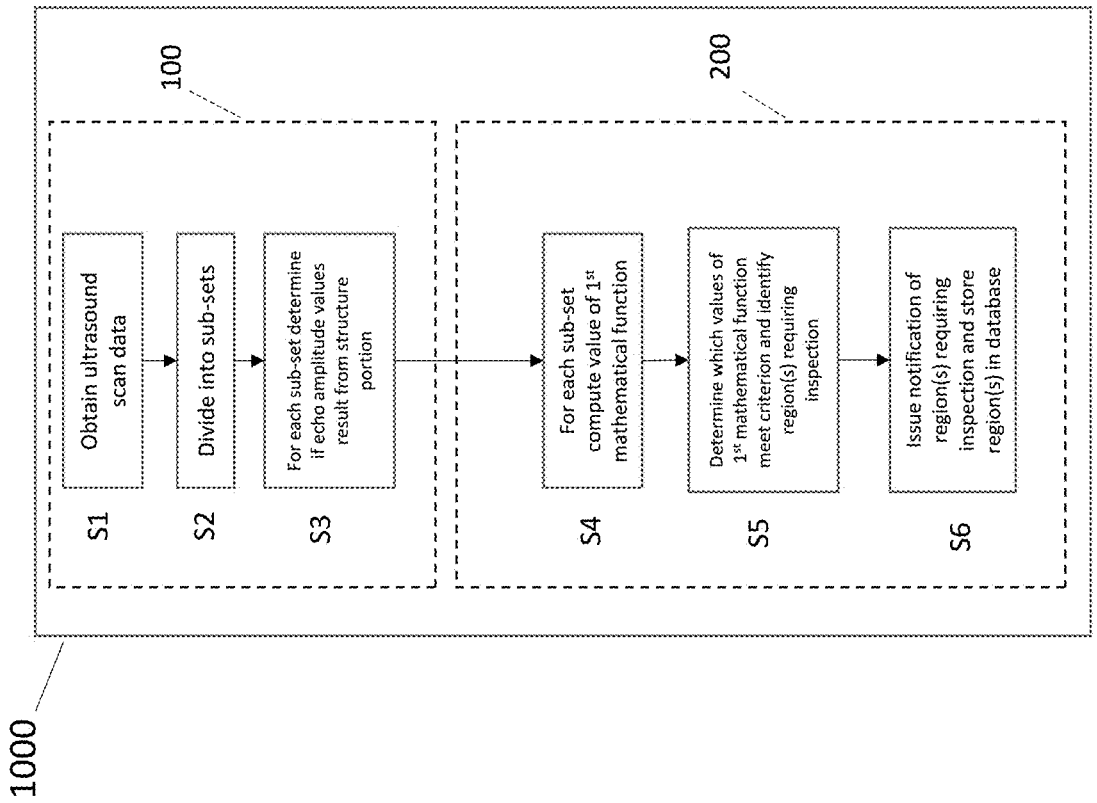
FIG. 1(a) is a flowchart for use in explaining a method according to an embodiment.

Reference will now be made in detail to the embodiments, examples of which are illustrated in the accompanying drawings, wherein like reference numerals refer to the like elements throughout. The embodiments are described below to explain the embodiments by referring to the figures.

As mentioned above, in embodiments the salient structure of the object under test, for example the back wall of the object, is assumed to be a continuous structure. Therefore, in a structure without defect, adjacent portions of the structure will be contiguous, i.e. as close to each other as it is possible to be. On the other hand, it is assumed that adjacent portions which are separated from each other by more than a threshold distance are indicative of a defective region of the structure. A defect detection method according to an embodiment may, for example, identify the presence of a defect based on heuristics relating only to the distance between centroids of adjacent portions of the structure. For example, the average distance between adjacent centroids in the longitudinal (i.e. y) direction may be determined and used to categorize a region of the structure as potentially defective if such distance exceeds some preset threshold (e.g. two standard deviations). In one alternative a model based on how magnetic force between magnetic poles is calculated may be applied to make this analysis. In this case the "magnetic force" between adjacent portions of the structure represents the degree of continuity of the salient structure of the test object. The stronger the force the less likely it is that there is a discontinuity in the salient structure.

The flowchart of FIG. 1(a) illustrates an automatic defect detection method 1000 for detecting a defect in an object in accordance with an embodiment. Steps S1 to S3 may be regarded as a wall structure detection process 100, and steps S4 to S6 may be regarded as a missing wall detection process 200. Step S1 of method 1000 comprises obtaining ultrasound scan data derived from an ultrasound scan of the object under consideration, the ultrasound scan data being in the form of a set of echo amplitude values representing the amplitude of echoes received from the object during ultrasound scanning at certain spatial and temporal points. At step S2 the set of echo amplitude values is divided into a plurality of sub-sets. At step S3 each sub-set is processed to determine whether any echo amplitude values of that sub-set may have resulted from a portion of a structure of interest of the object. Step S4 comprises computing for each sub-set, using at least a representative position of the structure portion of the sub-set and of another one of the sub-sets which neighbors that sub-set, a value of a first preselected mathematical function which is directly or inversely proportional to a distance between the representative positions. Step S5 comprises determining which values of the first preselected mathematical function which have been computed for the sub-sets meet a predetermined criterion, and identifying sub-sets for which the value of the first preselected mathematical function does not meet the predetermined criterion as regions of the ultrasound scan data that require inspection. At step S6 a notification indicating whether or not a region requiring inspection has been found is issued, and, if a region requiring inspection has been found, data identifying the region is stored in a database.

After a region requiring inspection has been found, the region in the image may be visually analyzed by an operator to identify one or more defects in the object under consideration. If a defect is identified in the analysis, in order to meet quality standards the object under consideration may be discarded or may be sent for repair, depending on the nature and severity of the defect. This may be done without physical inspection of the item (by the same or another operator), if the nature and severity of the defect is readily apparent from the visual analysis.

Figure 1B:
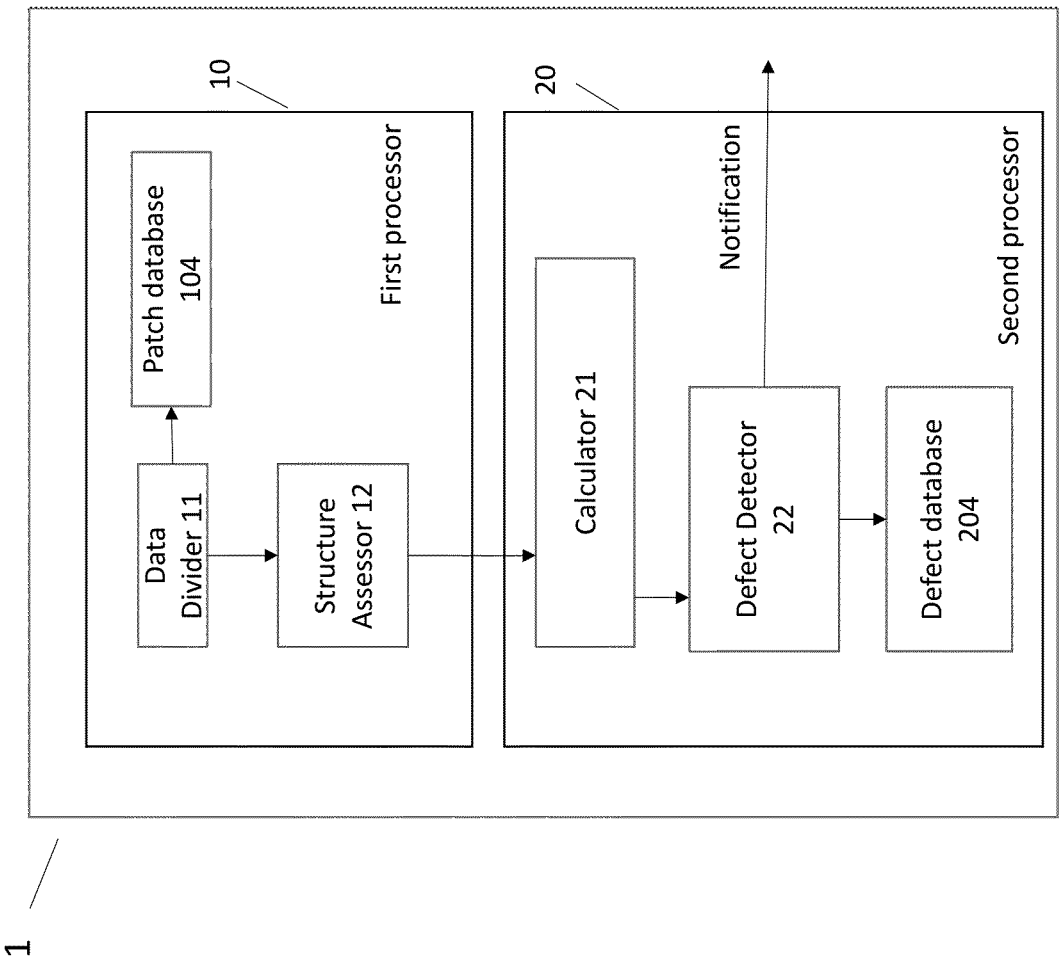
FIG. 1(b) is a block diagram of apparatus according to an embodiment.

FIG. 1(b) is a diagram depicting defect detection apparatus according to an embodiment which is configured to carry out the method of FIG. 1(a). Defect detection apparatus comprises first processor 10 and second processor 20. First processor 10 comprises a data divider 11, configured to divide the set of echo amplitude values into a plurality of sub-sets or "patches", a patch database 104 for storing the patch data, and a structure assessor 12, configured to assess each sub-set to determine whether any echo amplitude values of that sub-set may have resulted from a portion of a structure of interest of the object. Second processor 20 comprises a calculator 21 configured to compute for each sub-set, using at least a representative position of the structure portion of the sub-set and of another one of the sub-sets which neighbors that sub-set, a value of the first preselected mathematical function. The second processor 20 further comprises a defect detector 22 configured to identify sub-sets having a value of the first preselected mathematical function that does not meet the predetermined criterion as regions of the ultrasound scan data that require inspection, issue a notification indicating whether or not a region requiring inspection has been found, and, if a region requiring inspection has been found, store data identifying the region in defect database 204.

An embodiment will now be described in which samples of raw data corresponding to local scan regions are taken and transformed with an amplitude transformation function to identify the dominant wall structure. The full scan is represented as a data matrix of sound wave echo amplitudes, where each row corresponds to the echo measured at a given time $t_j$, and each column $x_i$, corresponds to the physical distance from the tip of the scanned object to the position where the measurement was taken.

Each data sample is a sub-matrix that will be processed to identify a bounding box (i.e. the smallest rectangle or square drawn along the x and y axes which encloses all points of the wall structure) for the relevant wall structure. The amplitude transform, which comprises an aggregation function, is applied to the amplitude measurements on a row by row basis to identify two coordinates along the t dimension, which bound the start and end data rows of the salient wall structure. The centroid of the bounding box is assigned a magnitude value, which is a function of the echo amplitudes corresponding to the wall structure captured by the sample region. Once all the scan regions are processed, the wall structure bounding boxes are modeled as a system of magnetic forces where neighboring centroids attract each other. The weaker the "force" between two neighboring centroids the more likely it is that an outlier region with missing wall echo will be observed. It should be noted that the magnetic force model is merely one of several appropriate models which may be used, and that no actual magnetic attraction need be present between the centroids.

Figure 2:
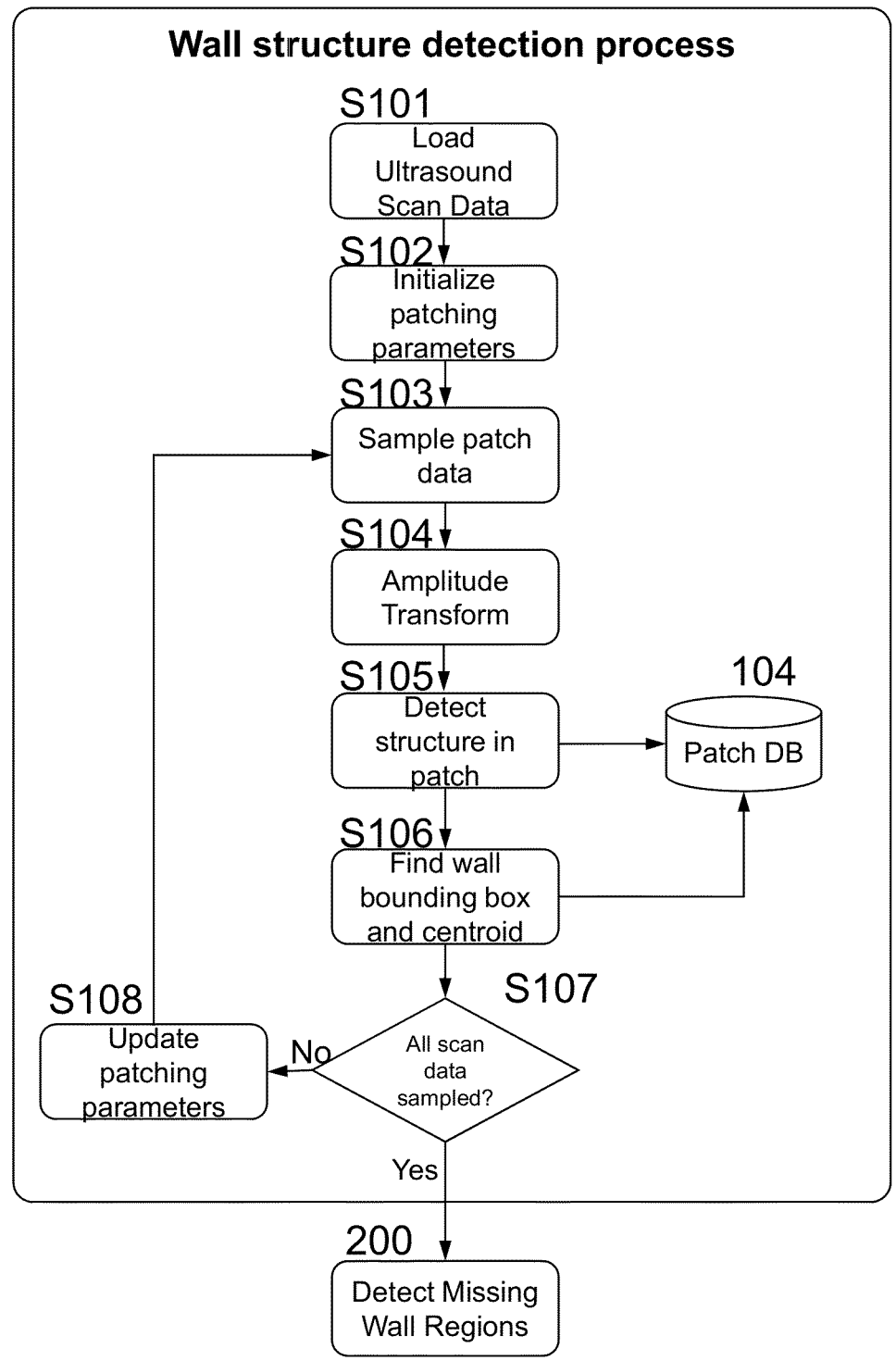
FIG. 2 is a flowchart of a wall structure detection process used in an embodiment.

As shown in FIG. 2, the wall structure detection process 100 of FIG. 1 starts at step S101 by loading the measurements of an ultrasound scan in its raw data format. The raw scan data can, for example, be represented as a matrix $A_{raw}$ or another two-dimensional data structure, comprising amplitudes of the echo signals along two dimensions: x, the distance from the tip of scanned object, and t, the time elapsed since the sound wave was emitted and the echo signal amplitude was measured.

Figure 5A:
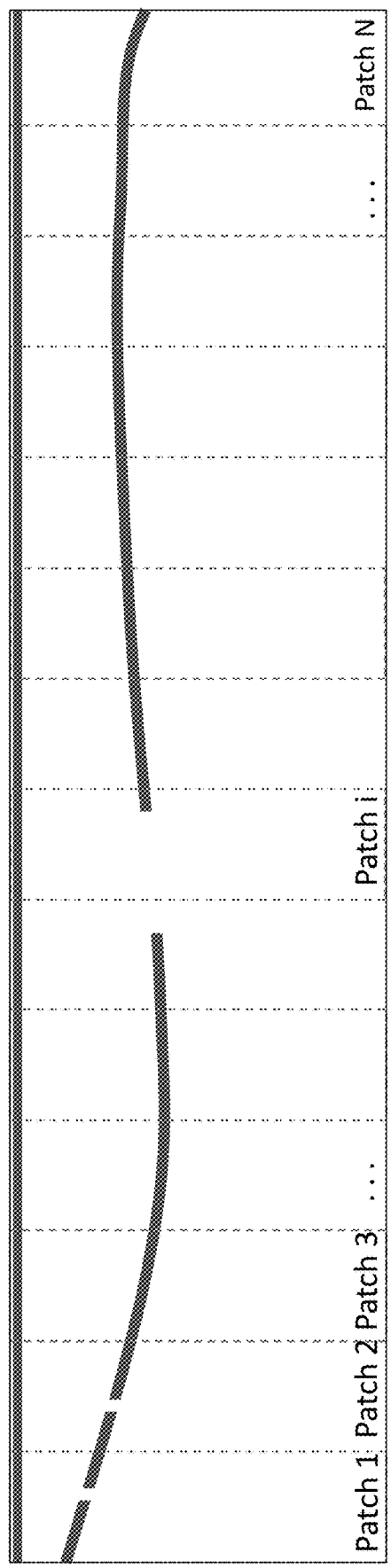
FIG. 5(a) depicts consecutive patches 1 to N sampled from the raw scan data.

At step S102 of FIG. 2 an initial set of parameters $x_0$, $x_{step}$, $x_{overlap}$ is set. The parameters are used in step S103 to sample the raw scan data by selecting a sub-matrix $A_{patch}$ (i.e. a subset of rows and columns of the raw data matrix $A_{raw}$ containing echo amplitude values for each pair $(x_i, t_j)$ included in the sampled patch) as shown in FIG. 3(a), such that for each pair $(x_i, t_j)$ of the sub-matrix $A_{patch}$ two conditions are observed: $x_0 \leq x_i \leq x_0+x_{step}$. Consecutive patches 1 to N sampled from the raw scan data are illustrated in FIG. 5(a).

The raw scan sub-matrix $A_{patch}$ is then processed in step S104 using an amplitude transform, in the form of a function that is applied to the amplitude values in each row ti, to obtain a vector $V_{patch}$ ($\sigma 1, \sigma 2, \sigma 3, \ldots \sigma i$), as shown in FIG. 3(b). The function comprises an aggregation function (e.g. sum, average, etc.) which aggregates the amplitude values. An example of such a function is shown below at equation (1), which is a weighted sum of the amplitude values of each row of the matrix $A_{patch}$. In the case of a simple sum, the values of wi are all equal to 1. In the case of a simple average wi are all equal to 1/N, where N is the number of columns of the matrix $A_{patch}$.

$$V_{patch}(t_j) = \sigma_j = \Sigma_{x_i \in X_{patch}} w_i \cdot A_{patch}(x_i, t_j) \quad (1)$$

In addition the function may include a smoothing function, such as a convolution filter, to smooth the values $\sigma_1$ (smoothing is applied to reduce the effect of neighbouring elements in the vector $V_{patch}$, having very different amplitude values). For example, the convolution filter could correspond to a moving average with a window size $w_{size}$ much smaller than the maximum value of t, $t_{max}$ (e.g. 5% of $t_{max}$).

FIG. 4 is a plot of the values of the vector $V_{patch}$ after the amplitude transform has been applied. The next step S105 is to detect a salient feature in the patch by determining the largest sequence of positive values in the vector $V_{patch}$, and its corresponding start and end coordinates along the t dimension, $t_{start}$ and $t_{end}$. In the vector $V_{patch}$ the largest sequence of positive values in $V_{patch}$, i.e. that shown from $t_{start}$ to $t_{end}$, corresponds to the largest salient feature (normally the test object back wall). Considering the visualization of vector $V_{patch}$ shown in FIG. 4, the start and end coordinates are defined respectively as the first and last t values of the positive sequence with the largest area under the curve.

The area under the curve for a given sequence can be calculated precisely, or approximated as the sum of amplitudes between $t_{start}$ and $t_{end}$, i.e. as shown in equation (2):

$$auc \approx \Sigma_{t=t_{start}}^{t_{end}} V_{patch}(t) \quad (2)$$

A maximum value of t, $t=\tau$, may be predefined in cases where an upper bound for filtering can be preset, for example by a user based on domain knowledge. In such a case, positive sequences beyond $t=\tau$ are discarded from the analysis. The values of $t_{start}$, $t_{end}$ and auc are stored in patch database 104. If $V_{patch}$ does not contain any positive sequences, i.e. does not contain any portion of the wall structure, the values of $t_{start}$, $t_{end}$ and auc are all set to 0, before being stored.

Figure 5B:
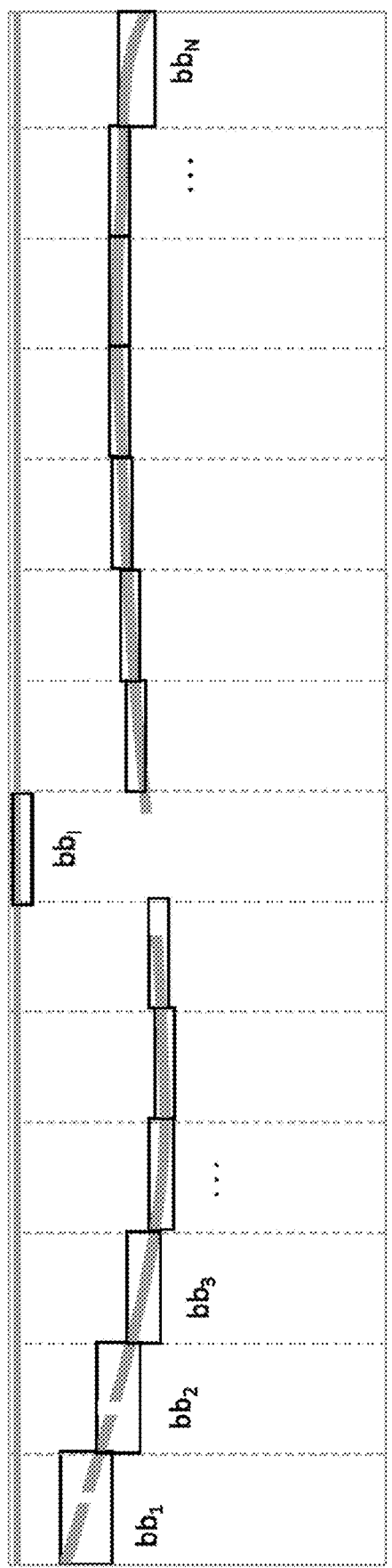
FIG. 5(b) depicts bounding boxes computed for patches 1 to N.
Figure 5C:
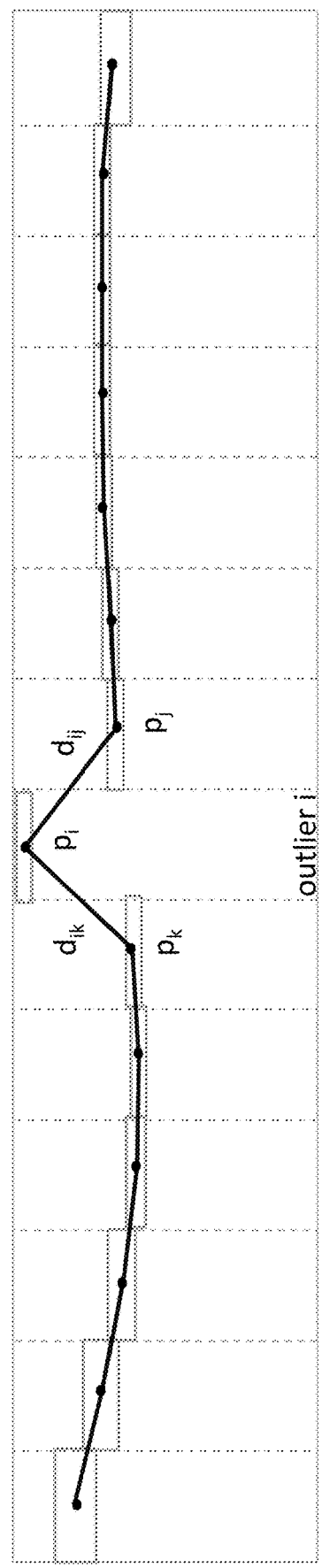
FIG. 5(c) depicts centroids computed for the bounding boxes of FIG. 5(b)

The next step, S106, is to compute the bounding box of the wall structure in the patch and its centroid, as depicted in FIGS. 5(b) and 5(c) respectively. The bounding box metadata may be stored as two pairs of coordinates: top-left corner coordinate $<x_i, t_{start}>$ and bottom-right corner coordinate $<x_i+x_{step}, t_{end}>$. The centroid coordinate, $<(x_i+x_{step})/2, (t_{end}-t_{start})/2>$, is also stored. If there is no wall structure in the patch, an artificial structure portion is assigned to the patch. In this case, the bounding box of the artificial structure portion has a height=0 and its centroid is located at t=0 (because $t_{end}=t_{start}$). By locating the centroid of the artificial structure portion at t=0 with the value of auc set to 0, outlier detection may be maximized in this embodiment.

The process checks at step S107 if all scan data have been sampled. If not (No, step S107), in step S108 the sampling window is updated to values of $x_{next}=x_{previous}+x_{step}-x_{overlap}$ and the process returns to step S103 to sample the next patch data, and iterates until the full raw data matrix has been processed (Yes, step S107).

Figure 6:
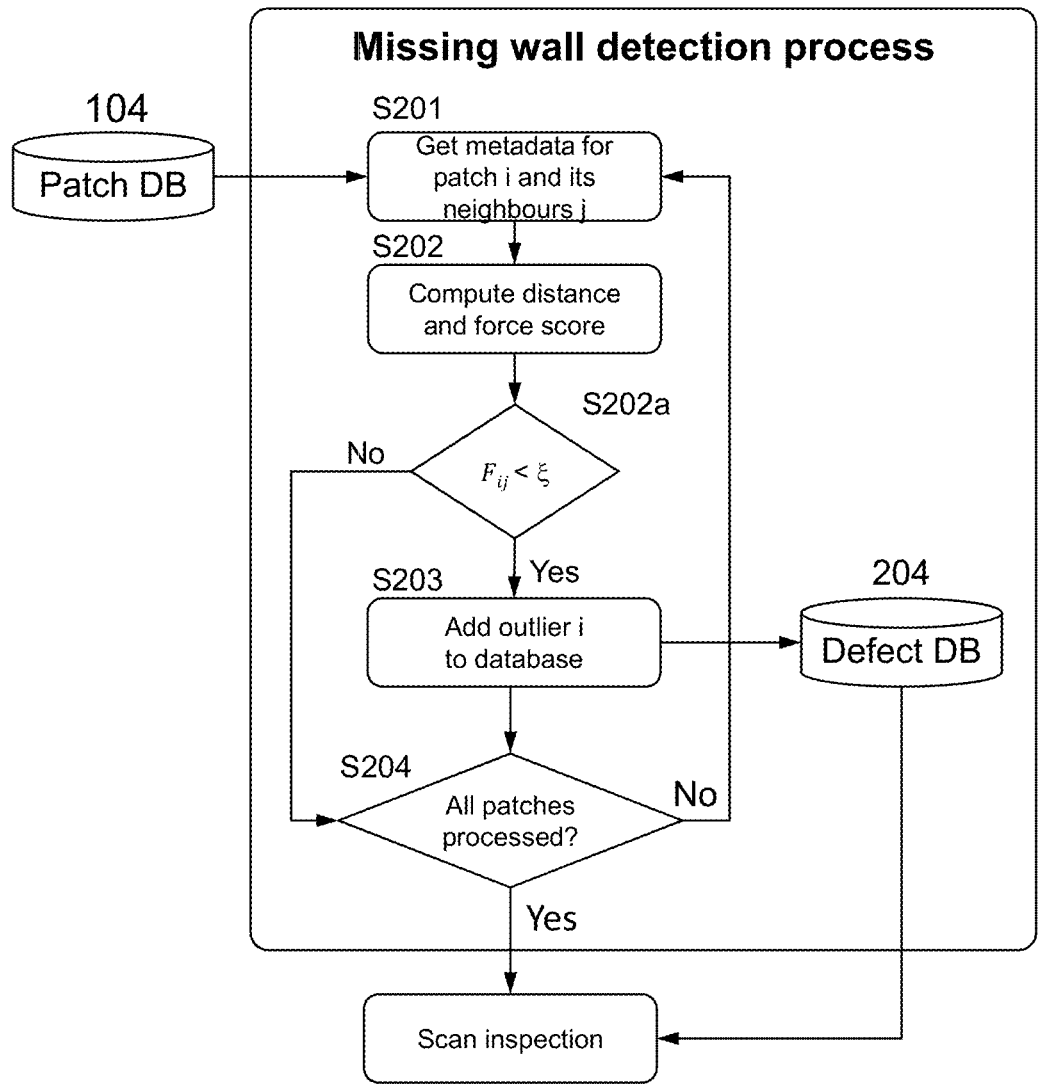
FIG. 6 is a flowchart of a missing wall detection process used in an embodiment.

After the wall structure detection process 100 has been completed, the missing wall detection process 200 is carried out in order to automatically detect missing segments of the relevant wall structure, such as the outlier patch i shown in FIGS. 5(a) to 5(c), as will now be described with reference to FIG. 6.

In this embodiment the process 200 models the centroids of the previously-identified bounding boxes as magnetic poles $p_i$ that attract each other. The "attraction" between centroids in neighboring patches i and j is modelled by the classic formula for the force between two magnetic poles:

$$F_{ij} = \frac{\mu \, m_i \, m_j}{\pi d_{ij}^2} \quad (3)$$

where $m_i$ and $m_j$ are the magnitudes of the poles, $d_{ij}$ is the separation between the poles, and $\mu$ is the permeability of the intervening medium.

In the context of the present embodiment the "magnetic permeability of the medium" is a constant of any value.

In this embodiment the magnitude $m_i$ of a centroid $p_i$ is defined as:

$$m_i = f(auc_i) = f(\Sigma_{t=t_{start(i)}}^{t_{end(i)}} V_{patch\_i}(t)) \quad (4)$$

and the distance $d_{ij}$ between two centroids $p_i$ and $p_j$ as the Euclidean distance, as indicated in equation (5) (although other suitable distance metrics may be used instead):

$$d_{ij} = \sqrt{(t(p_j)-t(p_i))^2 + (x(p_j)-x(p_i))^2} \quad (5)$$

In the above definition, the centroid magnitude $m_i$ is a function of the previously-computed area under the curve auc. There is no restriction on the definition of this function. It may, for example, be a simple linear function $f(auc_i) = \alpha \cdot auc_i$, where the parameter $\alpha$ may be tuned to give more or less weight to the magnitudes as compared to the distance between centroids. Alternatively, it may be a logarithmic function $f(auc_i) = \alpha \cdot \log(auc_i) + \beta$, that saturates for a given value of the aggregate echo amplitudes, or indeed any other suitable function defined based on operational parameters.

In step S201 of the process 200 metadata for patch i and its neighbour j (where j=i+1) are retrieved from the patch database 104. In step S202 the distance $d_{ij}$ between the centroids $p_i$ and $p_j$ of patches i and j is computed, for example in accordance with equation (5), and the "force"/"attraction" between the centroids $p_i$ and $p_j$ is computed in accordance with equation (3). In step S202a it is determined whether the computed value for "force" $F_{ij}$ for patch i is less than a global $\xi$ threshold 4 to identify outlier centroids. For example, the average force $F_{avg}$ and the standard deviation $F_{std}$ may be used to define the value of the global threshold as $\xi = F_{avg} + 2 \times F_{std}$. In this case, comparison of the force $F_{ij}$ computed for each patch with the global threshold $\xi$ would not be made until after the value of the force $F_{ij}$ had been computed for the centroids of all patches, and values for average force $F_{avg}$ and standard deviation $F_{std}$ over all the patches had been calculated. Another way to determine a value for the global threshold $\xi$ would be through an optimisation method. In this case, starting with a set of scans where outliers are already known, the forces $F_{ij}$ for all centroids would be computed and an optimisation algorithm would iteratively update the global threshold with an objective function that aims to minimize outlier detection error.

Any force value $F_{ij}$ that falls below the global threshold $\xi$ (Yes, step S202a) is labelled in step S203 as an outlier and stored in defect database 204, after which the process proceeds to step S204. If at step S202a the computed force value $F_{ij}$ equals or exceeds the global threshold $\xi$ (No, step S202a), the process proceeds directly to step S204. In step S204 it is determined whether all patches have been processed. If not (No, step S204) the process returns to step S201. Thus, the process 200 iterates over all pairs of adjacent patches until the whole scan has been processed. A quality control technician is then notified that outliers have been detected and require inspection.

A particular application of a defect detection method according to an embodiment will now be described with reference to FIGS. 7, 8(a), 8(b), 9(a) and 9(b).

Figure 7:
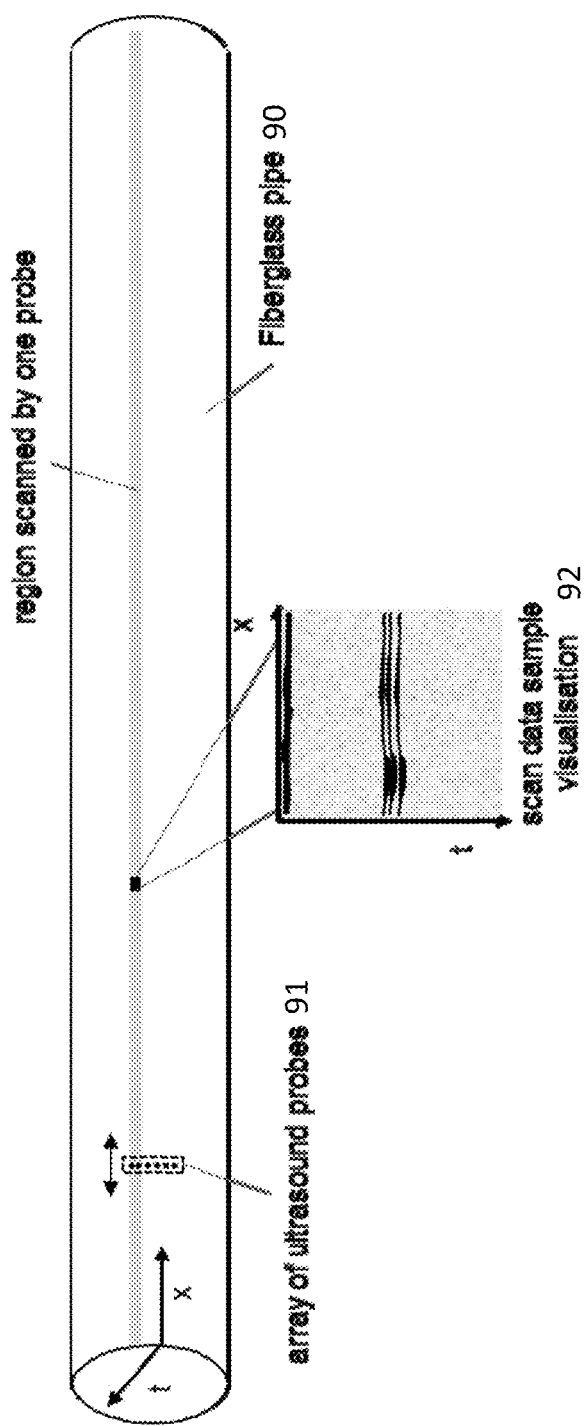
FIG. 7 is a diagram for use in explaining an application of an embodiment.

For example purposes, we consider a fiberglass pipe 90 as the test object, as shown in FIG. 7. Fiberglass is widely used in manufacturing of large structures that benefit from being light weight, while having high strength and durability properties. Early applications of fiberglass came from the aviation and aerospace industries for aircraft design. Nowadays, there are many other applications including ship hulls, pipes, surfboards, wind turbine blades, automobile body parts, water slides, pole vaulting poles, among others. Any manufacturing anomalies in such objects can have a significant impact on their structural integrity.

Ultrasonic NDT scanning is performed by an array of probes 91, which emit sound waves that propagate inside the pipe structure 90 and receive the echoes resulting from interactions with its front and back walls (FIG. 7). The amplitude of the echoes is measured along two dimensions, length x which is measured in a direction parallel to the length of the pipe 90, and time t. The resulting data may be represented as a numerical matrix with echo amplitudes, where each row i corresponds to a given propagation time $t_i$ and each column j corresponds to a given horizontal position xj. As mentioned above, the raw data matrix can be visualized (for example, by mapping a color gradient to the amplitude values of the echoes (e.g. a gradient from deep blue to dark red), as shown in scan data sample visualization 92.

The front and back structures of the test object are easily identifiable in the visualization, since the amplitudes of the echoes they produce usually stand out as dark coloured regions, hence making it easy to inspect for defects. Defects such as wrinkles in the fibreglass layers bring about distinct visual patterns in the scan, such as discontinuities or curvatures in the back structure region.

Figures 8A, 8B:
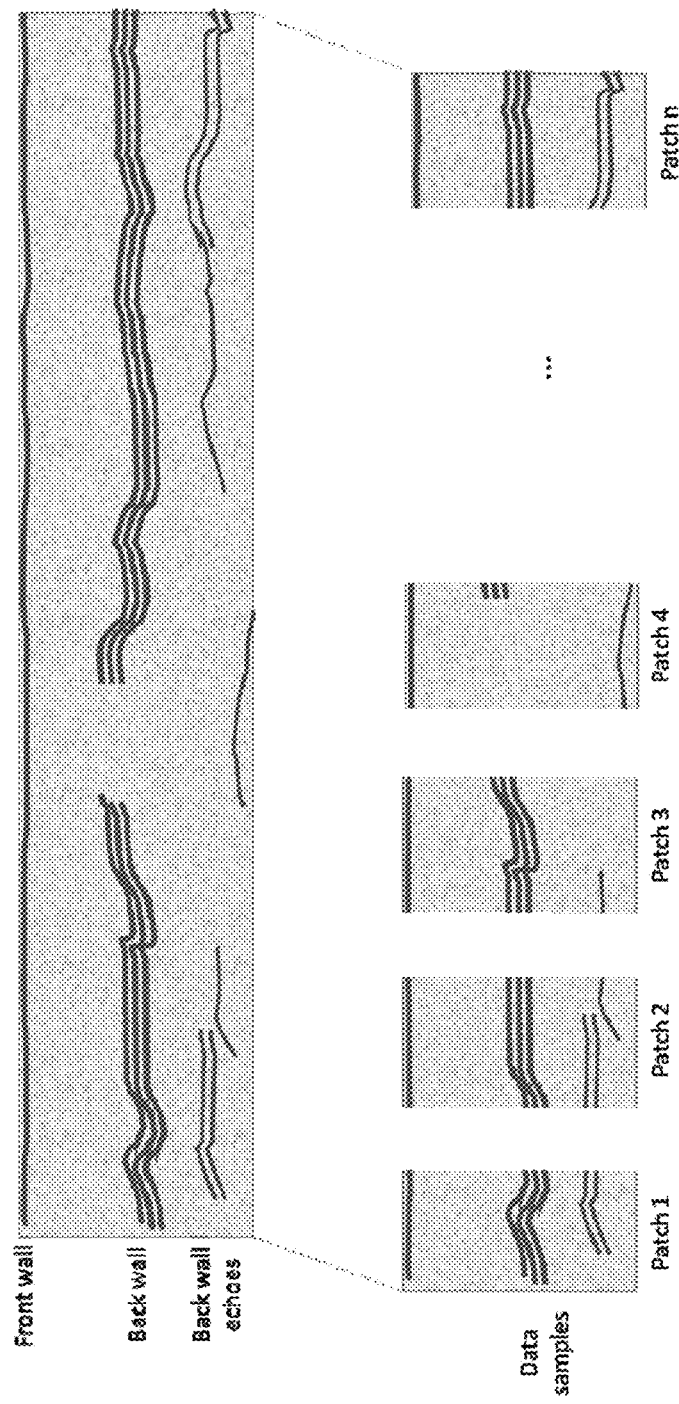
FIG. 8(a) is a diagram depicting a pixel-map visualization of the full scan with respect to FIG. 7.
FIG. 8(b) is a diagram depicting individual patches 1 to n corresponding to each individual data sample taken from the scan of FIG. 8(a)

The example presented in FIGS. 8(a) and 8(b) includes a pixel-map visualization of the full scan (FIG. 8(a)) and individual patches 1 to n corresponding to each individual data sample (FIG. 8(b)) obtained at step S103 of process 100.

Figures 9A, 9B:
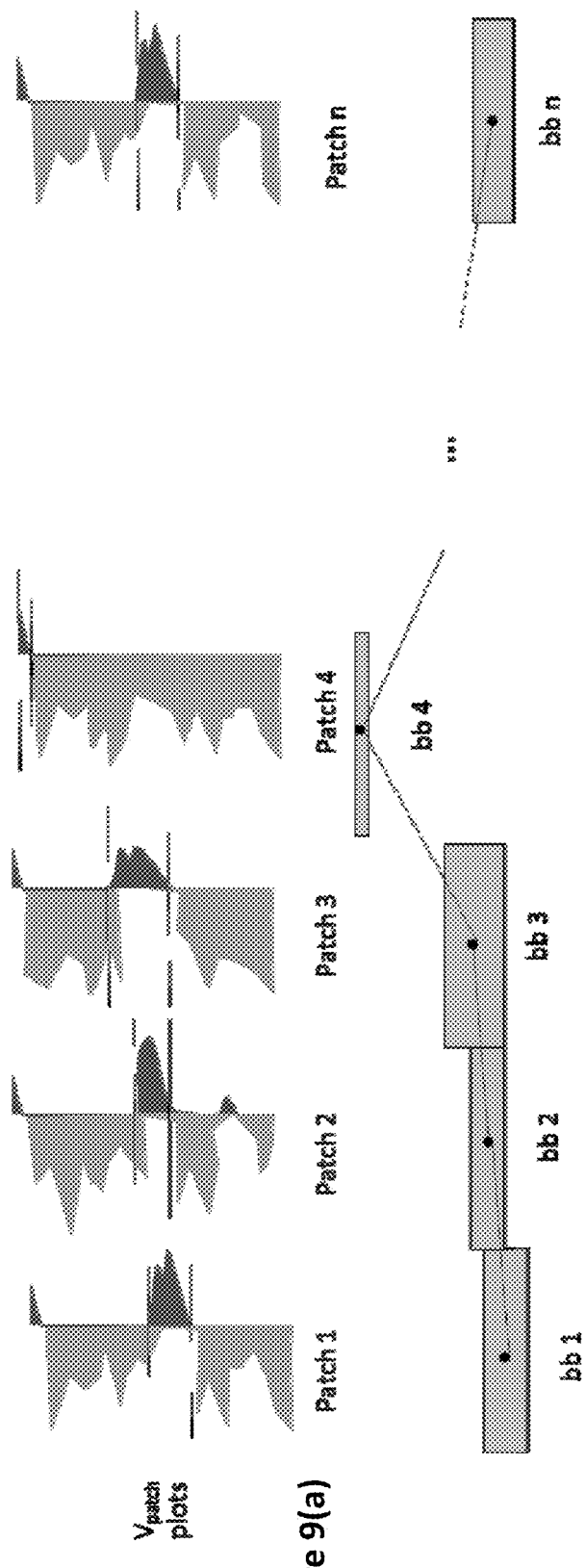
FIG. 9(a) is a diagram showing plots of vectors obtained after an amplitude transform is applied to each individual patch sample in FIG. 8(b)
FIG. 9(b) is a diagram showing bounding boxes of the patches 1 to n and their respective centroids.

Plots of the $V_{patch}$ vectors obtained after the amplitude transform is applied to each individual patch sample at step S104 of process 100 is shown in FIG. 9(a). The salient wall structure in each patch is found at step S105 of process 100. In the example shown in FIG. 9(a), the salient wall structure from each patch is delimited by two horizontal lines, corresponding to the start and end coordinates along the time dimension. The corresponding bounding boxes (bb1 to bbn) of the patches 1 to n and their centroids (marked by black dots), as found at step S106 of process 100, are shown in FIG. 9(b).

At step S202 of process 200, the "magnetic force" F between neighboring centroids is computed according to the formulae (2) to (4). At step S202a F is compared to the global threshold $\xi$; in this case $\xi = F_{avg} + 2 \times F_{std}$. These steps are carried out for each of patches 1 to n, and as a result patch 4 is flagged as an outlier.

Embodiments may be implemented in hardware, or as software modules running on one or more processors, or on a combination thereof. That is, those skilled in the art will appreciate that a microprocessor or digital signal processor (DSP) may be used in practice to implement some or all of the functionality described above.

The embodiments may also be one or more device or apparatus programs (e.g. computer programs and computer program products) for carrying out part or all of the methods described herein. Such programs may be stored on computer-readable media, or could, for example, be in the form of one or more signals. Such signals may be data signals downloadable from an Internet website, or provided on a carrier signal, or in any other form.

Figure 10:
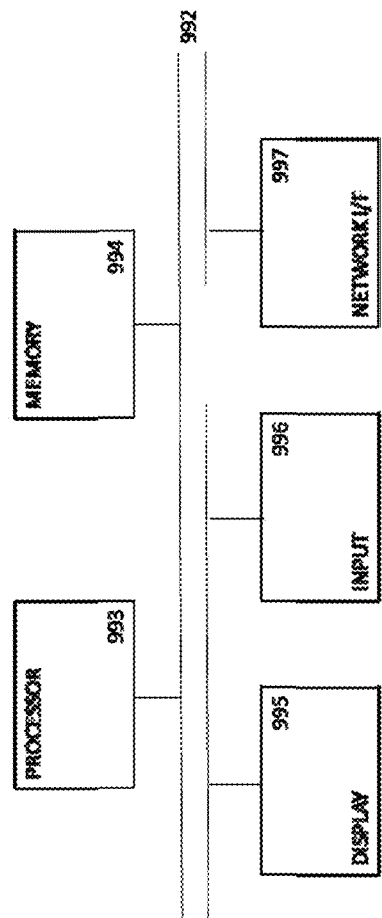
FIG. 10 is a block diagram of a computing device suitable for carrying out steps of a method, or performing tasks of apparatus, of an embodiment.

FIG. 10 is a block diagram of a computing device, such as a data storage server, which may be used to implement some or all of the steps of a method, and perform some or all of the tasks of apparatus, of an embodiment. For example, the computing device of FIG. 10 may be used to implement all the steps of the defect detection method 1000 illustrated in FIG. 1(a), and perform all the tasks of the defect detection apparatus 1 shown in FIG. 1(b), or only to implement some of the steps in the defect detection method 1000 of FIG. 1(a), such as some or all of steps S1 to S3 or some or all of steps S4 to S6, and only to perform some of the tasks of the defect detection apparatus 1 shown in FIG. 1(b), for example only those of the first processor 10, only those of the second processor 20, or only those of the defect detector 22.

The computing device comprises a processor 993, and memory, 994. Optionally, the computing device also includes a network interface 997 for communication with other such computing devices, for example with other computing devices of embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994, which may for example serve to store the patch database 104 and/or the outlier database 204, may include a non-transitory computer readable storage medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIG. 1(a), 2 and/or 6 and defined in the claims. For example, such computer program code may implement at least one of the data divider 10, the structure assessor 12, the calculator 21 and the defect detector 22 depicted in FIG. 1(b) and described earlier. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIVV) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball, etc. may be included in the computing device.

Methods may be carried out on a computing device such as that illustrated in FIG. 10. Such a computing device need not have every component illustrated in FIG. 10, and may be composed of a subset of those components. A method may be carried out by a single computing device in communication with one or more data storage servers via a network. The computing device may be a data storage itself storing at least a portion of the data.

A method may be carried out by a plurality of computing devices operating in cooperation with one another. One or more of the plurality of computing devices may be a data storage server storing at least a portion of the data.

The above-described embodiments may advantageously be used independently of any other of the embodiments or in any feasible combination with one or more others of the embodiments.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An automatic defect detection method for detecting a defect in an object, wherein the method comprises:
   obtaining ultrasound scan data derived from an ultrasound scan of the object under consideration, the ultrasound scan data being in a form of a set of echo amplitude values representing amplitude of echoes received from the object during ultrasound scanning at certain spatial and temporal points;
   dividing the set of echo amplitude values into a plurality of sub-sets;

assessing each sub-set to determine whether any echo amplitude values of the sub-set may have resulted from a portion of a structure of interest of the object;

computing for each sub-set, using at least a representative position and a representative magnitude of structure portion of the sub-set of another one of the sub-sets which neighbors the sub-set, a value of a preselected mathematical function which is inversely proportional to a distance between representative positions and is directly proportional to each of representative magnitudes;

identifying sub-sets having the value of the preselected mathematical function that does not meet a predetermined criterion as regions of the ultrasound scan data that require inspection;

issuing a notification indicating whether a region requiring inspection has been found; and storing, when the region requiring inspection has been found, data identifying the region in a database.

2. A method as claimed in claim 1, wherein an artificial structure portion, having a preset representative position and a preset representative magnitude, is assigned to each sub-set when determining that no echo amplitude values resulted from the portion of the structure of interest.

3. A method as claimed in claim 2, wherein the representative position and the representative magnitude of the structure portion are computed for each sub-set when determining that echo amplitude values may have resulted from the portion of the structure of interest.

4. A method as claimed in claim 3, wherein the preselected mathematical function is a first preselected mathematical function and:

the representative position of the structure portion is computed by computing a centroid of a bounding box containing the structure portion; and the representative magnitude of the structure portion is computed by applying a second preselected mathematical function to a parameter derived from the amplitude values forming a largest sequence of positive representative amplitude values.

5. A method as claimed in claim 1, wherein the representative position and the representative magnitude of the structure portion are computed for each sub-set when determining that echo amplitude values may have resulted from the portion of the structure of interest.

6. A method as claimed in claim 5, wherein the preselected mathematical function is a first preselected mathematical function and:

the representative position of the structure portion is computed by computing a centroid of a bounding box containing the structure portion; and the representative magnitude of the structure portion is computed by applying a second preselected mathematical function to a parameter derived from the amplitude values forming a largest sequence of positive representative amplitude values.

7. A method as claimed in claim 1, wherein assessing each sub-set to determine whether any echo amplitude values of the sub-set may have resulted from the portion of the structure of interest of the object comprises:

for each sub-set, deriving from the amplitude values in the sub-set a vector comprising a representative amplitude value for each time point in the sub-set;

determining for each vector whether the vector includes a sequence of positive representative amplitude values; and when the determining is satisfied, for each vector, identifying a largest sequence of positive representative amplitude values in the vector as the portion of the structure of interest and using a start time point and an end time point of a largest sequence to compute a bounding box containing the structure portion.

8. A method as claimed in claim 7, wherein deriving a vector comprises applying another preselected mathematical function, comprising an aggregation function, to those amplitude values in the sub-set which correspond to echoes received at a same time.

9. A method as claimed in claim 8, wherein the other preselected mathematical function further comprises a smoothing function.

10. A method as claimed in claim 1, wherein the object under consideration is at least one of: a manufactured object; and an object used in manufacture.

11. A method as claimed in claim 1, further comprising using a defect detected in the object to determine at least one of: a structural integrity of material forming at least part of the object; and flaws in material forming at least part of the object.

12. A non-transitory computer-readable storage medium carrying instructions which, when run on a computer, causes the computer to carry out a method as claimed in claim 1.

13. Defect detection apparatus for detecting a defect in an object, the apparatus comprising:

a first processor to process ultrasound scan data derived from an ultrasound scan of the object under consideration, the ultrasound scan data being in a form of a set of echo amplitude values representing amplitude of echoes received from the object during ultrasound scanning at certain spatial and temporal points, the processor operating to implement at least:

a data divider to divide the set of echo amplitude values into a plurality of sub-sets; and a structure assessor to assess each sub-set to determine whether any echo amplitude values of the sub-set may have resulted from a portion of a structure of interest of the object; and a second processor operating to implement at least:

a calculator to compute for each sub-set, using at least a representative position and a representative magnitude of a structure portion of the sub-set and of another one of the sub-sets which neighbors the sub-set, a value of a preselected mathematical function which is inversely proportional to a distance between representative positions and is directly proportional to each of the representative magnitudes;

a defect detector to identify sub-sets having the value of the preselected mathematical function that does not meet a predetermined criterion as regions of the ultrasound scan data that require inspection, issue a notification indicating whether a region requiring inspection has been found, and, when the region requiring inspection been found, store data identifying the region in a database.

14. An automatic defect detection method for detecting a defect in an object, wherein the method comprises:

obtaining ultrasound scan data derived from an ultrasound scan of the object under consideration, the ultrasound scan data being in a form of a set of echo amplitude values representing amplitude of echoes received from the object during ultrasound scanning at certain spatial and temporal points;

dividing the set of echo amplitude values into a plurality of sub-sets;

assessing each sub-set to determine whether any echo amplitude values of the sub-set may have resulted from a portion of a structure of interest of the object;

computing for each sub-set, using at least a representative position of a structure portion of the sub-set and of another one of the sub-sets which neighbors the sub-set, a value of a preselected mathematical function which is one of directly and inversely proportional to a distance between representative positions;

identifying sub-sets having the value of the preselected mathematical function that does not meet a predetermined criterion as regions of the ultrasound scan data that require inspection;

issuing a notification indicating whether a region requiring inspection has been found; and storing, when a region requiring inspection has been found, data identifying the region in a database;

wherein assessing each sub-set to determine whether any echo amplitude values of the sub-set may have resulted from the portion of the structure of interest of the object comprises:

for each sub-set, deriving from the amplitude values in the sub-set a vector comprising a representative amplitude value for each time point in the sub-set;

determining for each vector whether the vector includes a sequence of positive representative amplitude values; and when the determining is satisfied, for each vector, identifying a largest sequence of positive representative amplitude values in the vector as the portion of the structure of interest and using a start time point and an end time point of a largest sequence to compute a bounding box containing the structure portion.

15. A non-transitory computer-readable storage medium carrying instructions which, when run on a computer, causes the computer to carry out a method as claimed in claim 14.

* * * * *